United States Patent [19]
Kim

[11] Patent Number: 5,910,887
[45] Date of Patent: Jun. 8, 1999

[54] APPARATUS FOR CONTROLLING SWITCHING FREQUENCY OF SMPS TRANSFORMER FOR VIDEO DISPLAY APPLIANCE

[75] Inventor: Sang Yeal Kim, Kyoungsangnam-Do, Rep. of Korea

[73] Assignee: LG Electronics, Inc., Seoul, Rep. of Korea

[21] Appl. No.: 08/988,043

[22] Filed: Dec. 10, 1997

[30] Foreign Application Priority Data

Dec. 12, 1996 [KR] Rep. of Korea ..................... P96-64910

[51] Int. Cl.$^6$ ........................... H02M 3/335; H01J 29/70
[52] U.S. Cl. ................................. 363/21; 363/97; 315/411
[58] Field of Search ................... 363/21, 95, 97; 315/411

[56] References Cited

U.S. PATENT DOCUMENTS

| | | | |
|---|---|---|---|
| 4,368,409 | 1/1983 | Sivanesan et al. | 315/411 |
| 4,387,399 | 6/1983 | Novotny | 315/411 |
| 5,644,198 | 7/1997 | Park | 363/21 |
| 5,656,890 | 8/1997 | Park | 363/97 |
| 5,764,495 | 6/1998 | Faulk | 363/21 |

FOREIGN PATENT DOCUMENTS 2304940  8/1996  United Kingdom .

*Primary Examiner*—Stuart N. Hecker
*Attorney, Agent, or Firm*—Oppenheimer Wolff & Donnelly LLP

[57] ABSTRACT

An apparatus for controlling a switching frequency of a switching mode power supply (SMPS) for a video display appliance which can remove a switching noise generated during the switching-on and switching-off operations of an SMPS transformer by controlling the switching frequency of the SMPS transformer so that the duty of the SMPS transformer is kept in a predetermined range. The apparatus includes a flyback transformer for converting the voltage outputted from the SMPS transformer into a high voltage in accordance with a horizontal sync signal inputted thereto, a control section for outputting a control signal in accordance with the horizontal sync signal, a dividing section for dividing the horizontal sync signal in accordance with the control signal, a pulse transformer for outputting a predetermined pulse signal in accordance with an output pulse signal of the dividing section, a differentiation section for differentiating the pulse signal outputted from the pulse transformer to eliminate a negative pulse component of the pulse signal, a sawtooth sync generating section for generating a sawtooth sync signal by performing a switching operation in accordance with an output signal of the differentiation section, and a switching control section for outputting the switching frequency for a switching operation of the SMPS transformer in accordance with the sawtooth sync signal.

2 Claims, 4 Drawing Sheets

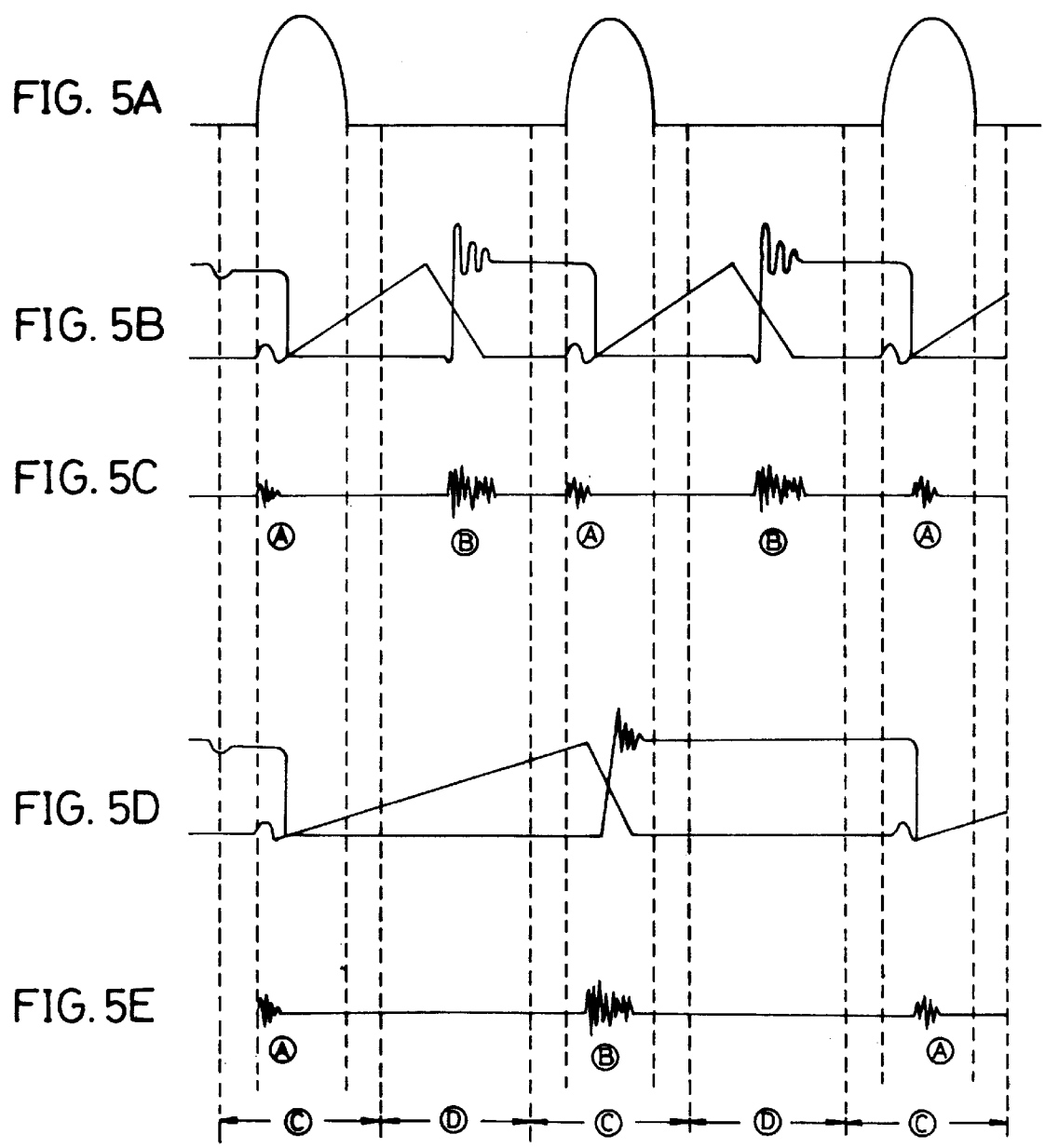

APPARATUS FOR CONTROLLING SWITCHING FREQUENCY OF SMPS TRANSFORMER FOR VIDEO DISPLAY APPLIANCE

FIELD OF THE INVENTION

The present invention relates to an apparatus for controlling a switching frequency of a switching mode power supply (SMPS) for a video display appliance, and more particularly to an apparatus for controlling a switching frequency of an SMPS for a video display appliance which can remove a switching noise generated during the switching-on and switching-off operations of an SMPS transformer by controlling the switching frequency of the SMPS transformer so that the duty of the SMPS transformer is maintained in a predetermined range.

DESCRIPTION OF THE RELATED ART

Generally, an SMPS has been widely used as a power supply of electric and electronic appliances since it can stably provide a driving voltage to loads.

A conventional SMPS, as shown in FIG. 1, includes an SMPS transformer 10 for switching an input power supply in accordance with a pulse-width-modulated (PWM) switching frequency to output a prescribed supply voltage, a rectifying section 20 for rectifying an output voltage of the SMPS transformer 10, a flyback transformer 40 for converting a rectified voltage outputted from the rectifying section 20 into a high voltage in accordance with a horizontal sync signal and provides the high voltage to a load 30, an error detecting section 50 for detecting the voltage inputted to the flyback transformer 40 and outputting an error correction signal, a photocoupler 60 for transferring the error correction signal outputted from the error detecting section 50, and a switching control section 70 for controlling the operation of the SMPS transformer 10 in accordance with the error correction signal inputted from the photocoupler 60 and the horizontal sync signal.

The operation of the conventional SMPS as constructed above will be explained with reference to FIG. 1.

The SMPS transformer 10 processes the commercial power supply inputted thereto in accordance with the switching control signal from the switching control section 70, and provides its output signal to the rectifying section 20. The rectifying section 20 rectifies the output voltage of the SMPS transformer 10, and provides a rectified voltage to the flyback transformer 40. The flyback transformer 40 converts the rectified voltage from the rectifying section 20 into a high voltage in accordance with the horizontal sync signal, and provides the high voltage to the load 30.

At this time, the error detecting section 50 detects the output voltage of the rectifying section 20, and outputs to the photocoupler 60 the error correction signal by comparing the detected voltage with a reference voltage. The photocoupler 60 transfers the error correction signal form the error detecting section 50 to the switching control section 70. Accordingly, the switching control section 70 controls the turn-on and turn-off of the SMPS transformer 10 by a switching frequency obtained in accordance with the error correction signal and the horizontal sync signal inputted thereto. At this time, the on/off timing of the SMPS transformer 10 coincides with the synchronous timing of the horizontal sync signal.

The conventional SMPS of the video display appliance, however, has the drawback that the picture quality of the appliance deteriorates since according to the conventional SMPS, the switching noise generated when the SMPS transformer 10 is switched on is removed, but the switching noise generated when the SMPS transformer 10 is switched off is not removed and is transferred to the load 30 such as a video processing circuit. also, since the switching frequency of the SMPS transformer should be synchronized with the horizontal sync signal having a high frequency, the efficiency of the SMPS transformer is decreased accordingly.

SUMMARY OF THE INVENTION

It is an object of the present invention to solve the problems involved in the related art, and to provide an apparatus for controlling a switching frequency of an SMPS transformer for a video display appliance which can remove a switching noise generated during both the switching-on time and the switching-off time of the SMPS transformer by controlling the switching frequency of the SMPS transformer so that the duty of the SMPS transformer is maintained in a predetermined range, thereby improving the picture quality of the appliance.

In order to achieve the above object, there is provided an apparatus for controlling a switching frequency of an SMPS transformer for a video display appliance, which comprises the SMPS transformer for switching an input power supply in accordance with a pulse-width-modulated (PWM) switching frequency to output a prescribed supply voltage, a flyback transformer for converting the voltage outputted from the SMPS transformer into a high voltage in accordance with a horizontal sync signal inputted thereto, a control section for outputting a control signal in accordance with the horizontal sync signal inputted thereto, a dividing section for dividing the horizontal sync signal in accordance with the control signal from the control section, a pulse transformer for outputting a predetermined pulse signal in accordance with an output pulse signal of the dividing section, a differentiation section for differentiating the pulse signal outputted from the pulse transformer to eliminate a negative pulse component of the pulse signal, a sawtooth sync generating section for generating a sawtooth sync signal by performing a switching operation in accordance with an output signal of the differentiation section, and a switching control section for outputting the switching frequency for a switching operation of the SMPS transformer in accordance with the sawtooth sync signal from the sawtooth sync generating section.

BRIEF DESCRIPTION OF THE DRAWINGS

The above object, other features, and advantages of the present invention will become more apparent by describing the preferred embodiment thereof with reference to the accompanying drawings, in which:

FIGS. 5A to 5E waveform diagrams explaining the difference between the present invention and the conventional SMPS.

DETAILED DESCRIPTION OF THE PREFERRED EMBODIMENT

Figure 1:
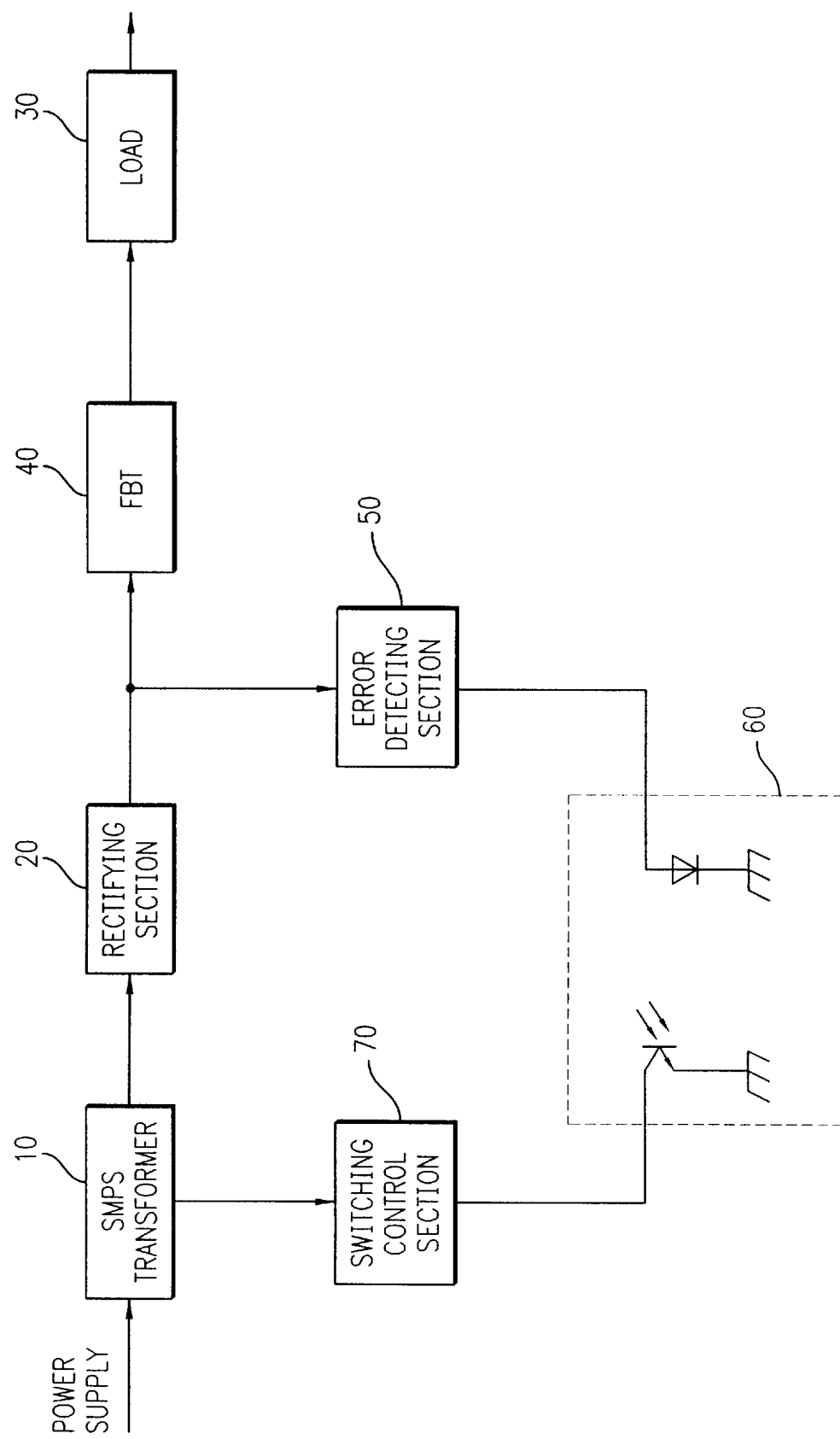
FIG. 1 is a block diagram illustrating the construction of a conventional SMPS for a video display appliance.
Figure 2:
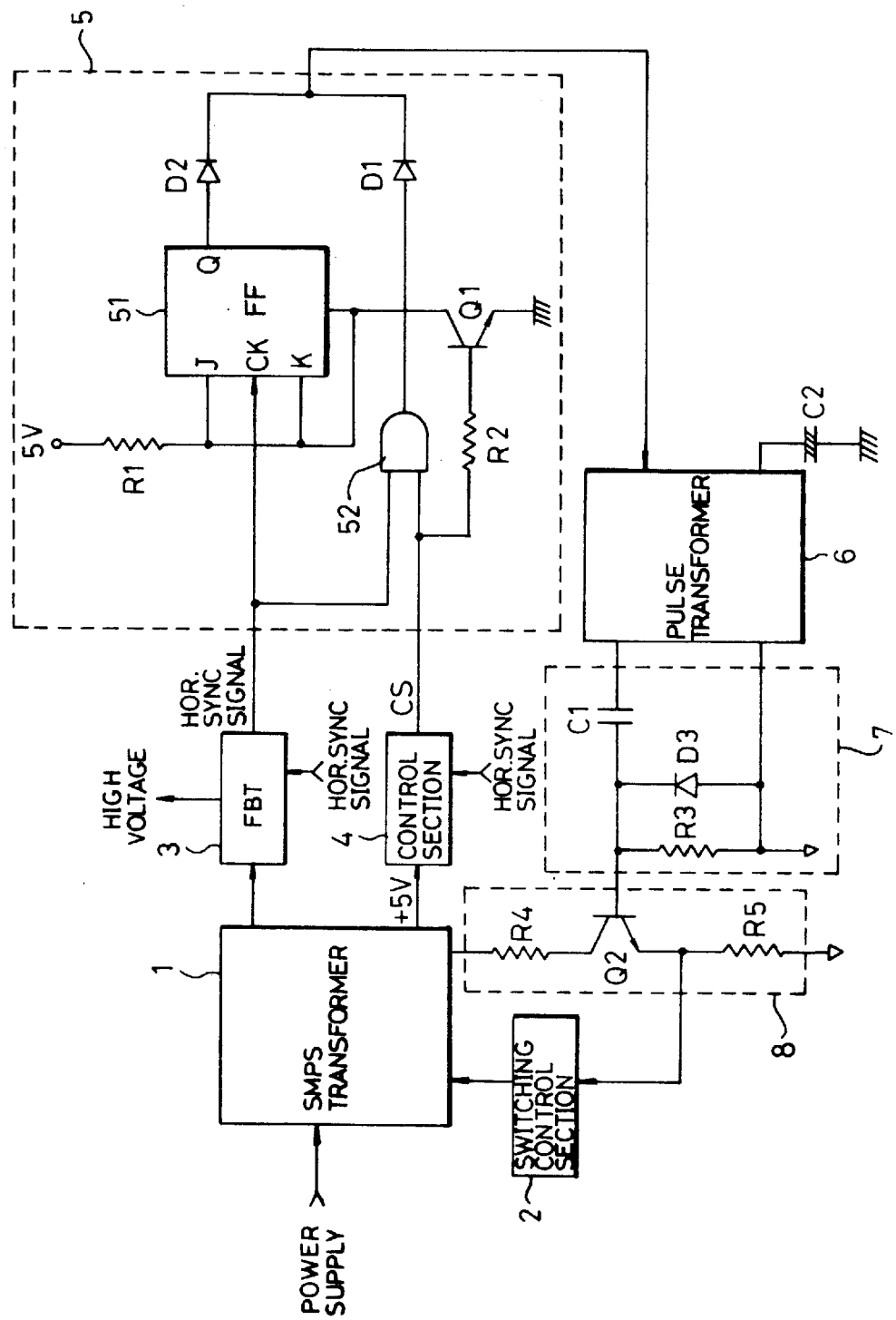
FIG. 2 is a block diagram illustrating the construction of a switching frequency control apparatus of an SMPS transformer according to the present invention.

FIG. 2 illustrates the construction of the switching frequency control apparatus of an SMPS transformer of a video display appliance according to the present invention.

Referring to FIG. 2, the switching frequency control apparatus according to the present invention includes an SMPS transformer 1 for switching an input power supply in accordance with a PWM switching frequency to output a prescribed supply voltage, a flyback transformer 3 for converting the voltage outputted from the SMPS transformer 1 into a high voltage in accordance with a horizontal sync signal inputted thereto, a control section 4 for outputting a control signal CS in accordance with the horizontal sync signal inputted thereto, a dividing section 5 for dividing the horizontal sync signal provided through the flyback transformer 3 in accordance with the control signal CS from the control section 4, a pulse transformer 6 for outputting a predetermined pulse signal in accordance with an output pulse signal of the dividing section 5, a differentiation section 7 for differentiating the pulse signal outputted from the pulse transformer 6 to eliminate a negative pulse component of the pulse signal, a sawtooth sync generating section 8 for generating a sawtooth sync signal by performing a switching operation in accordance with an output signal of the differentiation section 7, and a switching control section 2 for outputting the switching frequency for a switching operation of the SMPS transformer 1 in accordance with the sawtooth sync signal from the sawtooth sync generating section 8.

The dividing section 5 comprises a JK-type flip-flop 51 for inverting its output signal whenever the horizontal sync signal inputted thereto goes from a 'high' level to a 'low' level, an AND gate 52 for AND-gating the horizontal sync signal from the flyback transformer 3 and the control signal CS from the control section 4, the output of the AND gate 52 being superimposed on the output of the JK-type flip-flop 51, and a transistor Q1 for controlling the operation of the JK-type flip-flop 51 in accordance with the chip select signal from the control section 4.

The output of the flyback transformer 3 is connected to a clock input terminal of the JK-type flip-flop 51 and one input terminal of the AND gate 52 to provide the horizontal sync signal thereto, respectively. The output terminal of the control section 4 in connected to another input terminal of the AND gate 52 and the base of the transistor Q1 to provide the control signal CS thereto, respectively. The output terminal of the JK-type flip-flop 51 and the output terminal of the AND gate 52 are connected in common to the input terminal of the pulse transformer 6.

The differentiation section 7 comprises a resistor R3 and a capacitor C1, coupled to the output terminal of the pulse transformer 6, for differentiating the output signal of the pulse transformer 6, and a diode D3, connected to the capacitor C1, for clamping a differentiated signal within a predetermined level.

The sync generating section 8 comprises a transistor Q2 for outputting a predetermined sawtooth sync pulse signal to the switching control section 2 in accordance with the differentiated pulse signal inputted from the differentiation section 7.

The horizontal sync signal provided from a personal computer and so on is inputted to the flyback transformer 3 and the control section 4. In FIG. 2, the reference numerals R1 to R5 denote resistors, C2 denotes a capacitor, and D1 and D2 denote diodes.

The operation of the switching frequency control apparatus of an SMPS transformer for a video display appliance according to the present invention as constructed above will now be explained.

Referring to FIG. 2, if the commercial power supply is inputted to the SMPs transformer 1, the SMPS transformer 1 performs a switching operation in accordance with the switching frequency inputted from the switching control section 2, and provides an output voltage to the flyback transformer 3 and a supply voltage of 5V to the control section 4. Accordingly, the flyback transformer 3 converts the input voltage into a high voltage in accordance with the horizontal sync signal, and provides the high voltage to respective circuit blocks of the monitor. At this time, the horizontal sync signal provided through the flyback transformer 3 is inputted to the JK-type flip-flop 51 in the dividing section 5 as its clock input.

Figure 3A:
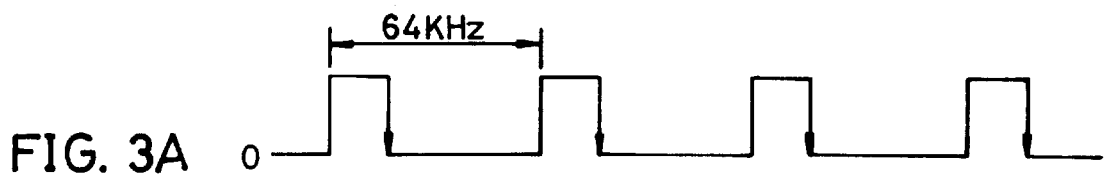
FIGS. 3A to 3D are waveform diagrams illustrating the output waveforms of the dividing section of FIG. 2 in case that the horizontal frequency exceeds a predetermined frequency.
Figure 3B:
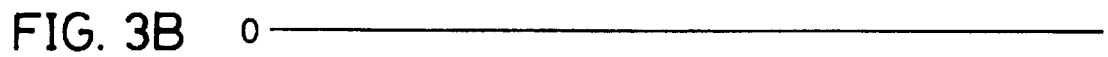
Figure 3C:

At the same time, the control section 4 detects the horizontal sync signal inputted thereto, and outputs the control signal CS to the dividing section 5. At this time, if the horizontal sync signal exceeds a predetermined reference frequency, for instance, 64 KHz as shown in FIG. 3A, the control section 4 outputs the control select signal of a 'low' level as shown in FIG. 3B to the input terminal of the AND gate 52 in the dividing section 5. Accordingly, the AND gate 52, which receives the horizontal sync signal and the 'low' level signal from the control section 4 as its input signals, outputs a 'low' level signal as shown in FIG. 3C.

Figure 3D:
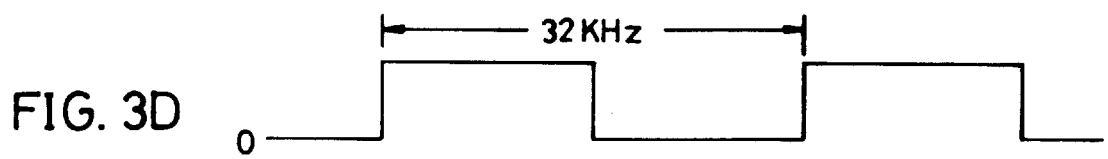

Also, the 'low' level chip select signal from the control section 4 is inputted to the base of the transistor Q1 through the resistor R2, causing the transistor Q2 to be turned off. Accordingly, the JK-type flip-flop 51 inverts its output signal at the falling edge of the horizontal sync signal as shown in FIG. 3D. As a result, the JK-type flip-flop 51 divides by 2 the horizontal sync signal of 64 KHz, and outputs the divided horizontal sync signal of 32 KHz to the pulse transformer 6. The pulse transformer 6 outputs a pulse signal having a predetermined voltage level to the capacitor C1 in the differentiation section 7 in accordance with the divided horizontal sync signal outputted from the JK-type flip-flop 51.

The capacitor C1 and the resistor R3 in the differentiation section 7 differentiate the pulse signal inputted from the pulse transformer 6, and outputs the differentiated signal to the base of the transistor Q2 in the sync generating section 8. At this time, the differentiated signal is clamped within the predetermined level by the diode D3. The sync generating section 8 produces and outputs to the switching control section 2 the sawtooth sync pulse signal in accordance with the output signal of the differentiation section 7. The switching control section 2 receives the sawtooth sync pulse signal as its switching frequency, and controls the on/off operation of the SMPS transformer 1. At this time, the on/of timing of the SMPS transformer 1 coincides with the synchronous timing of the horizontal sync signal.

Figure 4A:
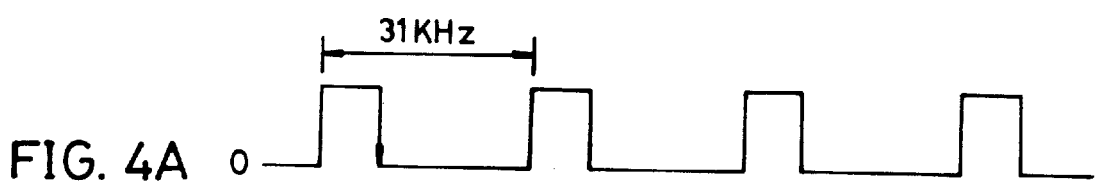
FIGS. 4A to 4D are waveform diagrams illustrating the output waveforms of the dividing section of FIG. 2 in case that the horizontal frequency is below a predetermined frequency.
Figure 4B:
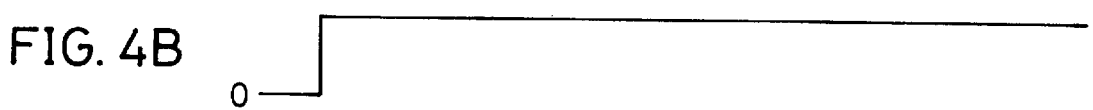
Figure 4C:
Figure 4D:
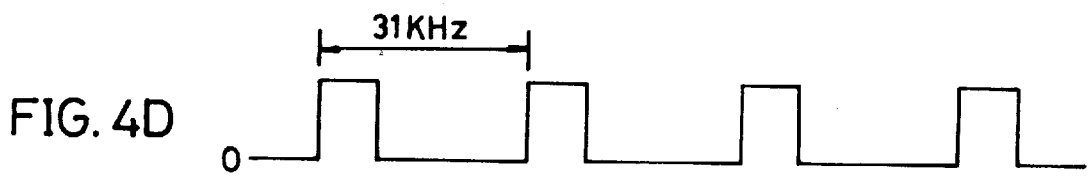

Meanwhile, if the frequency of the horizontal sync signal inputted to the flyback transformer 3 is below 64 KHz, for instance, is 31 KHz as shown in FIG. 4A, the control section 4 provides the control signal CS of a 'high' level as shown in FIG. 4B to the input terminal of the AND gate 52 in the dividing section 5. The AND gate 52, which receives the horizontal sync signal through the flyback transformer 3 and the 'high' level signal from the control section 4, outputs to the pulse transformer 6 a pulse signal that is identical to the horizontal sync signal as shown in FIG. 4C.

Also, the 'high' level control signal CS from the control section 4 is inputted to the base of the transistor Q1 through the resistor R2, causing the transistor Q1 to be turned on.

Accordingly, the JK-type flip-flop 51 does not operate due to the turned-on transistor Q1. As a result, the pulse transformer 6 outputs a pulse signal of a predetermined voltage level to the capacitor C1 in the differentiation section 7 in accordance with the output signal of the AND gate 52.

The capacitor C1 and the resistor R3 in the differentiation section 7 differentiate the pulse signal inputted from the pulse transformer 6, and outputs the differentiated signal to the base of the transistor Q2 in the sync generating section 8. At this time, the differentiated signal is clamped within the predetermined level by the diode D3. The sync generating section 8 produces and outputs to the switching control section 2 the sawtooth sync pulse signal in accordance with the output signal of the differentiation section 7. The switching control section 2 receives the sawtooth sync pulse signal as its switching frequency, and controls the on/off operation of the SMPS transformer 1. At this time, the on/off timing of the SMPS transformer 1 coincides with the synchronous timing of the horizontal sync signal.

According to the control apparatus of the present invention as described above, the SMPS transformer 1 can be operated with its duty kept in the range of 50±5%. In other words, both the switching-on and the switching-off of the SMPS transformer 1 are performed within the blanking interval.

FIGS. 5A to 5E are waveform diagrams explaining the difference between the present invention and a conventional SMPS. In detail, FIG. 5A illustrates the horizontal sync signal inputted to the JK-type flip-flop 51, FIG. 5B illustrates the switching waveform of the SMPS transformer, and FIG. 5C illustrates a switching noise generated during the switching-on/off of the conventional SMPS circuit. FIG. 5D illustrates the switching waveform of the SMPS transformer operated according to the present invention, and FIG. 5E illustrates a switching noise generated during the switching-on/off of the SMPS circuit according to the present invention.

Referring to FIGS. 5A to 5C, according to the conventional SMPS circuit, the switching noise "A" generated during the switching-on of the SMPS transformer exists in the retrace period "C", but the switching noise "B" generated during the switching-off of the SMPS transformer exists in the horizontal scanning period "D", i.e., the picture display period, as shown in FIG. 5C, resulting in that the picture distortion is produced due to the switching noise "B".

However, according to the present invention, both the switching noises "A" and "B" generated during the switching-on and switching-off operations of the SMPS transformer exist in the retrace period "C" as shown in FIG. 5E, and thus no picture distortion is produced.

Also, even though the horizontal sync signal of a high frequency is inputted, it is divided by the dividing section 5, resulting in that the power loss through the coils and core of the SMPS transformer as well as that through the SMPS switching elements such as transistors and field effect transistors (FETs) can be greatly reduced.

Specifically, the coils and core of the SMPS transformer 1 and the switching elements such as transistors and FETs have the characteristics that their efficiency is decreased in proportion to the increase of the switching frequency. According to the present invention, if the horizontal sync signal of a high frequency is inputted, it is divided to be used as the switching frequency, thereby increasing the efficiency of the coils, core, and switching elements such as transistors and FETs which constitute the SMPS transformer.

As described above, according to the present invention, the switching noise generated during the switching-on and switching-off operations of the SMPS transformer is reduced by controlling the switching frequency of the SMPS transformer so that the duty of the SMPS transformer is maintained in a predetermined range, thereby improving the picture quality of the video display appliance.

While the present invention has been described and illustrated herein with reference to the preferred embodiment thereof, it will be understood by those skilled in the art that various changes in form and details may be made therein without departing from the spirit and scope of the invention.

What is claimed is:

1. An apparatus for controlling a switching frequency of an SMPS transformer for a video display appliance having a flyback transformer for converting a voltage outputted from the SMPS transformer into a high voltage in accordance with a horizontal sync signal inputted thereto, the apparatus comprising:

a control section for outputting a control signal in accordance with the horizontal sync signal inputted thereto;

a dividing section for dividing the horizontal sync signal in accordance with the control signal from the control section;

a pulse transformer for outputting a predetermined pulse signal in accordance with an output pulse signal of the dividing section;

a differentiation section for differentiating the pulse signal outputted from the pulse transformer to eliminate a negative pulse component of the pulse signal;

a sawtooth sync generating section for generating a sawtooth sync signal by performing a switching operation in accordance with an output signal of the differentiation section; and a switching control section for outputting the switching frequency for a switching operation of the SMPS transformer in accordance with the sawtooth sync signal from the sawtooth sync generating section.

2. The apparatus as claimed in claim 1, wherein the dividing section comprises:

a JK-type flip-flop for inverting its output signal whenever the horizontal sync signal inputted thereto goes from a 'high' level to a 'low' level;

an AND gate for AND-gating the horizontal sync signal and the control signal from the control section, the output of the AND gate being superimposed with the output of the JK-type flip-flop; and a transistor for controlling the operation of the JK-type flip-flop in accordance with the control signal from the control section.

* * * * *